No. 623,532.　　　　　　　　　　　　　　　　Patented Apr. 25, 1899.
T. DUNCAN.
ELECTRIC METER.
(Application filed Oct. 17, 1898.)

(No Model.)　　　　　　　　　　　　　　　　　2 Sheets—Sheet 1.

Witnesses
Samuel R. Bachtel.
Adelaide Kearns.

Thomas Duncan Inventor
By his Attorneys Chapin & Denny

No. 623,532. Patented Apr. 25, 1899.
T. DUNCAN.
ELECTRIC METER.
(Application filed Oct. 17, 1898.)
(No Model.) 2 Sheets—Sheet 2.

Witnesses
Samuel R. Bachtel
Adelaide Kearns.

Thomas Duncan Inventor
By his Attorney Chapin & Denny

UNITED STATES PATENT OFFICE.

THOMAS DUNCAN, OF FORT WAYNE, INDIANA.

ELECTRIC METER.

SPECIFICATION forming part of Letters Patent No. 623,532, dated April 25, 1899.

Application filed October 17, 1898. Serial No. 693,698. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in integrating motor-meters and belongs to that class adapted for measuring the energy of alternating-current systems of distribution.

The objects of the present invention are, first, to provide a meter that will measure the true energy or watts when employed on circuits containing either inductive or non-inductive translating devices, or both; second, to provide a meter in which a shunt or derived circuit is employed to impart a starting torque for balancing the friction and inertia of its revoluble parts and in which the derived circuit will also be employed to assist in establishing a magnetic field that shall lag ninety degrees behind the electromotive force of the system of supply; third, to provide a meter in which no mutual induction will take place between the series or ampere field coil or coils and the shunt field-coil employed to impart the initial or starting torque to the revoluble elements of the meter; fourth, to provide a meter in which variations in the starting torque can be made without altering the current in the circuit in which it is included; fifth, to provide a meter in which changes can be made in altering the starting torque for overcoming the friction on light loads from time to time after the meter has been installed and as occasion requires, whereby accuracy on all loads can be maintained as the age and friction of the meter increase.

Figure 1:
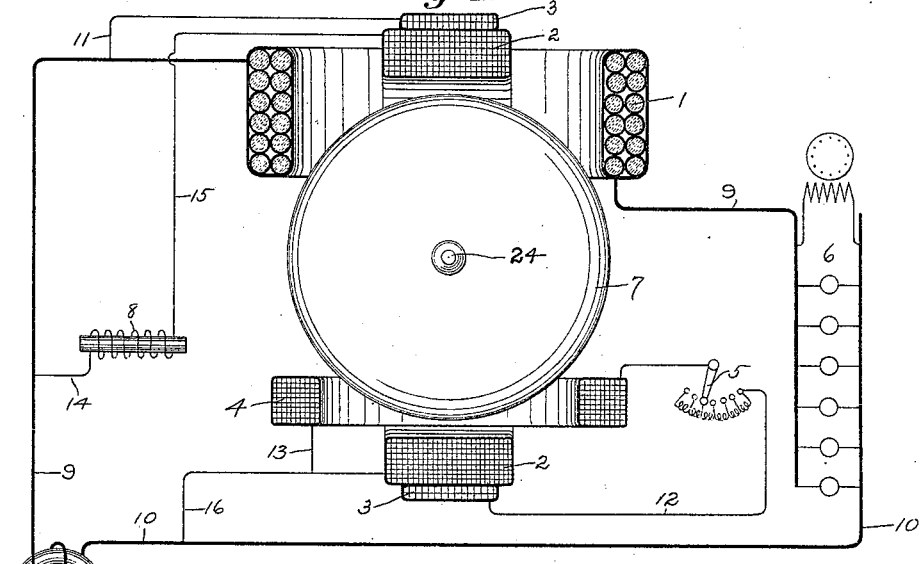
Figure 2:
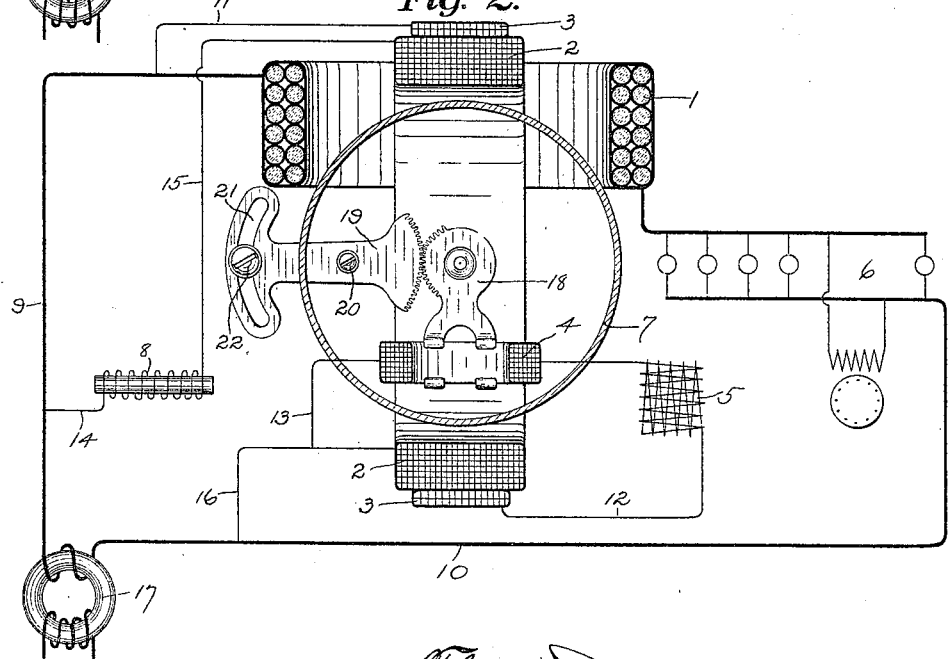
Figure 3:
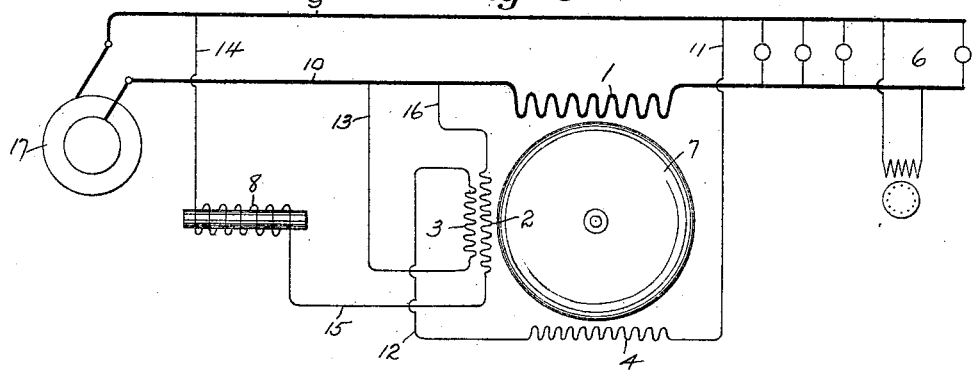
Figure 4:
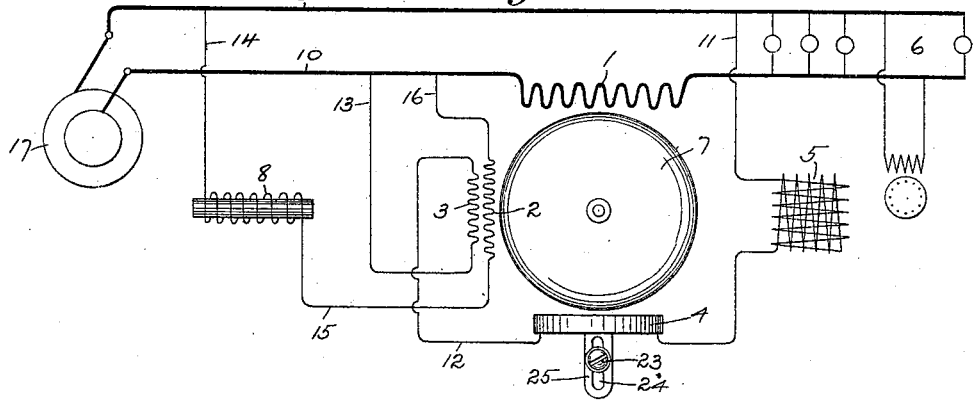
Figure 5:
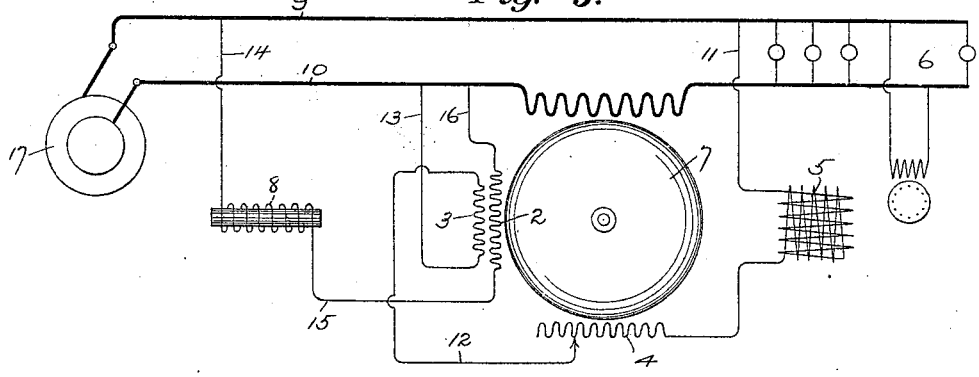

In the accompanying drawings, in which similar reference-numerals indicate like parts, Figure 1 is a plan view showing one form of my invention with the several energizing-coils in section. Fig. 2 is a modified form of the invention in transverse section, showing the starting or friction eliminating coil located inside the revoluble armature and means for varying the position of said coil relative to the volt-coil. Figs. 3, 4, and 5 are diagrammatic views of the invention, showing the various windings and connections of the circuits and energizing-coils.

The series field-coil 1, carrying the main current, is adapted to establish a magnetic field which is proportional to the current in amperes. A shunt-coil 2 of fine wire is employed in establishing a magnetic field that is proportional to the electromotive force of the supply system. The auxiliary shunt-coil 3 is used in inductive relation to the shunt-coil 2, whereby the magnetism resulting from the mutual inductive coöperation of the said coils 2 and 3 can be caused to lag ninety degrees or be in quadrature with the electromotive force which said magnetism represents. A friction compensating coil 4 is used to overcome or balance the friction or inertia of the revoluble parts of the meter, thereby assisting it to measure small loads with accuracy. A non-inductive resistance 5 is used in series with the said coils 3 and 4. The translating devices 6 consist of a mixed load—*i. e.*, in inductive and non-inductive apparatus. A revoluble aluminium armature 7, of the cylindrical type and cup-shaped, if desired, is fixed in any proper manner upon a concentric spindle 24, provided with suitable bearings. For the purpose of lagging the current through the shunt-coil 2 an impedance-coil 8 is provided, the wires 11, 12, and 13 connecting the coils 3 and 4 in series with each other and in multiple to the service mains or leads 9 and 10. The impedance-coil 8 and the shunt field-coil 2 are connected in series with each other and in multiple to the leads 9 and 10 by the wires 14, 15, and 16. The reference-numeral 17 represents a proper transformer. The said compensating coil may be variously arranged either within or without the armature. In Fig. 2 this coil 4 is rigidly mounted in a bifurcated clamp 18, having a segmental gear adapted for a meshing engagement with the adjacent end of a pivoted adjusting-arm 19. This clamp 18 is pivoted concentric with the armature-spindle. The arm 19 is fulcrumed on the pivot 20, has a curved slot 21 in its free end, and is adapted to adjust the said clamp 18 and its surmounted coil 4 in any desired position relative to the series coil 1, and is rigidly secured in such position by the screw 22 in said slot 21. As shown in Fig. 4, the said starting-coil 4 may be rigidly mounted upon the inner end of a lateral arm 25, provided with a longitudinal slot 24 and a set-screw 23, arranged in said slot, thereby being adapted for an adjustment to or from the armature for varying the starting torque. In Fig. 5 is shown a means for varying the starting torque by cutting in more or less of the turns comprising the coil 4.

In the following description of the operation of my improvement special reference is made to Fig. 1, in which the transformer 17 is shown as supplying energy to the translating device 6. A coil 1, wound with coarse wire and intended to carry the current supplying the translating devices, is included in one of the series leads or mains, called the "ampere-coil," or the one whose magnetism acting upon the cylindrical armature will vary with and be proportional to the current in amperes. Embraced by or within the field of said series coil are arranged the aluminium cylindrical armature 7 and the coils 2 and 3. The axes of the said coils 2 and 3 are coincident and at right angles to the said coil 1. The current and magnetism set up by the volt-coil 2 are proportional to the electromotive force in volts between the leads or mains 9 and 10. An impedance-coil 8 of any suitable construction is connected in series with the volt-coil 2 for the purpose of lagging the current through the latter to as nearly ninety degrees as is possible behind the electromotive force of the mains 9 and 10 in order that the torque of the meter on inductive loads may be proportional to the true energy or real watts. As it is impractical to obtain a current that will lag ninety degrees through the instrumentality of an impedance-coil, I employ in inductive relation to said coil 2 an auxiliary coil 3, and by combining their magnetizing forces a resultant magnetic field is established that is adjusted to exact quadrature or ninety degrees behind the electromotive force of the leads 9 and 10. In other words, when the translating devices are non-inductive, such as incandescent lamps, the magnetism of the series coil 1 will be in step or phase with the electromotive force of the said leads and ninety degree or a quadrature period ahead of or in advance of the resultant magnetism of the coils 2 and 3. The magnetism of the series coil 1 and the resultant magnetism of the coils 2 and 3 combine into another resultant magnetic field, which actuates the armature in a well-understood manner, with a torque proportional to the real watts or current multiplied by pressure multiplied by cosine of the angle of lag. The starting-coil 4 is connected in series with the phase-adjusting coil 3 and is employed to overcome the friction and inertia of the revoluble parts of the meter. The said coils 3 and 4 are supplied with current from the mains 9 and 10 by the wires 11, 12, and 13. A variable resistance 5 is also employed in series with the coils 3 and 4. This resistance may be used to adjust the current through the coil 3 for the purpose of adjusting the resultant magnetism of the coils 2 and 3 to quadrature. The starting-coil 4 is arranged coaxially with the series coil 1, but is mounted in any suitable manner at an opposite diameter from the coil 1 to prevent any mutual inductive action between the said coils. In this manner there will be two distinct torque-producing fields acting upon the armature, one being that set up by the series coil 1 and the coils 2 and 3, the other being set up by the starting-coil 4 and the said coils 2 and 3. Assuming that the electromotive force and lag are constant, the torque of the coils 1, 2, and 3 will vary directly as the current through the coil 1, while the torque tending to overcome the friction will be constant. If a change in pressure takes place, the torque of the latter coils will vary as the same of the electromotive force. When the proper angle of magnetism resulting from the coils 2 and 3 has been secured, the starting torque, or that for balancing the friction and inertia, is adjusted by varying the position of the coil 4 to or from the armature in any suitable manner. This arrangement permits a variation in the starting torque without altering or changing the current flowing through the coil 4 and at the same time prevents any possible mutual induction between the starting-coil and the series field-coil.

The common practice at the present time to locate starting-coils inside of the series coil I find to be objectionable on account of the former becoming or undergoing a secondary-circuit condition by the magnetism of the latter.

Having thus described my invention, what I desire to secure by Letters Patent is—

1. In an induction-motor meter the combination of a cylindrical armature; a series coil in inductive relation to a portion of the periphery of said armature; a shunt-coil 2; a second shunt-coil 3 in mutual inductive relation to the said shunt-coil 2; a friction compensating coil 4 in series with the said second shunt-coil 3; a variable resistance in series with the said friction compensating coil and the said second shunt-coil 3; an impedance-coil in series with the shunt-coil 2; the said friction compensating coil arranged upon the opposite side of the cylindrical armature from the said series coil, to avoid mutual induction as described.

2. In an induction-motor meter of the class described the combination of a cylindrical armature; a series coil; a shunt-coil 2 whose magnetic axis is at right angles to the axis of the said series coil; an impedance-coil in series with the said shunt-coil 2; a second shunt-coil 3 in coöperative relation with the said shunt-coil 2 for the purpose specified; a friction compensating coil in series with the said second shunt-coil 3; a resistance in series with the said second shunt-coil 3 and the said friction compensating coil 4; the said friction compensating coil 4 having its magnetic axis approximately at right angles to the said shunt-coils 2 and 3 and adapted to actuate the cylindrical armature in the same direction as the said series coil.

3. In an induction-motor meter the combination of a series coil; a cylindrical armature; a shunt-coil 2; a second shunt-coil 3; a resistance in series with the said second shunt-coil 3; a friction compensating coil 4 in series with the said second shunt-coil and the said resistance; the said friction compensating coil 4 being adjustable for the purpose of varying the starting torque as set forth; an impedance-coil in series with the shunt-coil 2; and means for changing the adjustment or position of the said coil 4.

4. In an induction-motor meter a series coil; a shunt-coil 2; an impedance-coil in series with the said shunt-coil 2; a second shunt-coil 3 in coöperative relation with the said shunt-coil 2; an adjustable friction compensating coil 4; a cylindrical armature in inductive relation to the said series coil, said shunt-coils 2 and 3, and said compensating coil; the adjustable clamp 18; and an adjustable lever 19 for varying the adjustment and position of the said clamp and said coil 4 for the purpose set forth.

Signed by me, at Fort Wayne, Allen county, State of Indiana, this 13th day of October, A. D. 1898.

THOMAS DUNCAN.

Witnesses:
M. GRACE WEBBER,
NELLIE FISHER.